United States Patent
Comeau et al.

(10) Patent No.: US 9,077,396 B2
(45) Date of Patent: Jul. 7, 2015

(54) DISTRIBUTED BUFFER STORE BASED UPLINK COORDINATED MULTIPOINT COMMUNICATIONS

(71) Applicant: Telefonaktiebolaget L M Ericsson (publ), Stockholm (SE)

(72) Inventors: Adrien Joseph Comeau, Ottawa (CA); Gary David Boudreau, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 118 days.

(21) Appl. No.: 13/663,037

(22) Filed: Oct. 29, 2012

(65) Prior Publication Data

US 2014/0120929 A1    May 1, 2014

(51) Int. Cl.
| | |
|---|---|
| *H04W 72/00* | (2009.01) |
| *H04B 7/02* | (2006.01) |
| *H04L 1/18* | (2006.01) |
| *H04L 5/00* | (2006.01) |
| *H04W 92/20* | (2009.01) |
| *H04L 1/00* | (2006.01) |

(52) U.S. Cl.
   CPC .............. *H04B 7/024* (2013.01); *H04L 5/0035* (2013.01); *H04W 92/20* (2013.01); *H04L 1/1812* (2013.01); *H04L 1/1864* (2013.01); *H04L 2001/0092* (2013.01)

(58) Field of Classification Search
   CPC .............................. H04W 16/04; H04W 16/10
   USPC ................................. 455/452.1; 370/328, 338
   See application file for complete search history.

(56) References Cited

U.S. PATENT DOCUMENTS

| | | | | |
|---|---|---|---|---|
| 2011/0263271 | A1* | 10/2011 | Hoymann et al. | ......... 455/456.1 |
| 2012/0147815 | A1* | 6/2012 | Meyer et al. | .................. 370/328 |

FOREIGN PATENT DOCUMENTS

| | | |
|---|---|---|
| EP | 2234308 A1 | 9/2010 |
| EP | 2 320 592 A1 | 5/2011 |
| WO | 2010034528 A1 | 4/2010 |
| WO | 2010105702 A2 | 9/2010 |
| WO | 2011045658 A1 | 4/2011 |

OTHER PUBLICATIONS

International Search Report and Written Opinion dated Apr. 30, 2014 for International Application Serial No. PCT/IB2013/059632, International Filing Date: Oct. 24, 2013 consisting of 21-pages.

* cited by examiner

*Primary Examiner* — Amancio Gonzalez
(74) *Attorney, Agent, or Firm* — Christopher & Weisberg, P.A.

(57) ABSTRACT

A method and system for providing CoMP assistance in a wireless communication network are disclosed. In one embodiment a cooperating base station receives a CoMP assistance request from a serving base station. The CoMP assistance request is a request for assistance to decode a first transmission from a UE. The cooperating base station receives the first transmission from the UE. The first transmission from the UE is received at the cooperating base station at one of a time before receiving the CoMP assistance request and a time after receiving the CoMP assistance request. The cooperating base station determines a CoMP payload in response to the CoMP assistance request. The CoMP payload is based on the received first transmission from the UE. The CoMP payload is forwarded to the serving base station after the serving base station determines that the first transmission from the UE is received by the serving base station with error.

24 Claims, 9 Drawing Sheets

DISTRIBUTED BUFFER STORE BASED UPLINK COORDINATED MULTIPOINT COMMUNICATIONS

TECHNICAL FIELD

The present invention relates to wireless communications networks, and in particular to methods and systems for providing coordinated multi-point, CoMP, assistance from a cooperating base station to a serving base station serving a user equipment, UE.

BACKGROUND

The growing demands on mobile networks to support data applications at higher throughputs and spectral efficiencies have driven the need to develop Orthogonal Frequency Division Multiplexing (OFDM) based 4th generation (4G) networks including third generation partnership project, 3GPP, Long Term Evolution (LTE) networks. Because of the scarcity of spectrum, the same frequencies are reused at all cell sites. The resulting interference limited system will not achieve the full potential capacity that the LTE standard can support without the implementation of one or more interference mitigation and/or cancellation techniques. Interference mitigation and/or cancellation techniques have been investigated and deployed with varying degrees of success in mobile networks for over 20 years. Traditional approaches have focused on ensuring orthogonality between transmitted signals in time or frequency. Other systems operate spatially or by actively removing and cancelling interfering signals from the desired signal.

In early second generation, 2G, cellular systems, orthogonality was achieved primarily through static pre-planned allocations of radio resources. Third generation, 3G, systems introduced interference cancellation techniques based mostly on a combination of blind information gathered at a base station such as spectrum usage monitoring and coarse exchange of interference indicators such as the Rise over Thermal (RoT) indicator employed in the 3GPP 1xEV-DO standard. Typically interfering signals have been estimated using blind detection and their estimates subtracted from the desired signals.

In 4G networks, the advanced evolution of LTE has focused on Coordinated Multipoint (CoMP) as a means to improve performance of the air interface. The central concept of Uplink Coordinated Multipoint (UL CoMP) is that although a user equipment, UE, is served by one cell, the neighboring cells may receive the UE's signal with sufficient quality such that they may be able to contribute to the reception and processing of the UE's signal and payload.

Referring now to the drawing figures, in which like reference designators denote like elements, there is shown in FIG. 1 a diagram of one embodiment of a known coordinated multi-point network 10. The network 10 includes a plurality of geographically dispersed user equipment mobile terminals 14a, 14b, 14c, referred to collectively herein as user equipment (UE) 14, each located within a corresponding geographic area 16a, 16b, 16c referred to collectively herein as cells 16. Each cell 16 is served by a respective base station 12a, 12b, 12c, referred to collectively herein as base stations 12. Each base station 12 receives uplink signals from the UEs 14 and processes (e.g., decodes) the uplink signals to recover information symbols therein.

A base station, e.g., base station 12a, serving certain UEs, e.g. UE 14a, may nonetheless also receive uplink signals from other UEs, e.g., UE 14c, located within another cell, e.g., cell 16c. Rather than simply treating such uplink signals as inter-cell interference, the base station 12a cooperates with the serving base station 12c of UE 14c. In particular, the base station 12a sends the uplink signals to the serving base station 12c of UE 14c over a backhaul communication link 18 between the base stations 12. The serving base station 12c of UE 14c then jointly processes the uplink signals it received itself and the uplink signals received from other base stations 12 in order to mitigate inter-cell interference. It will be understood that in some embodiments, multiple cells may be serviced by a single base station. Thus, for example, two or more cells may be hosted from a common physical location. In these cases, a CoMP payload may be shared between cells hosted at the same physical location by connections between entities at the physical location. These connections may be inter-card or inter-unit connections.

Any given base station, e.g., base station 12a, therefore operates as a serving base station with respect to UEs 14 located within its served cell, e.g. cell 16a, while operating as a so-called cooperating base station with respect to UEs, e.g., UEs 14b and 14c located within another cell, e.g., cell 16b and/or cell 16c. Likewise from the perspective of any given mobile terminal, e.g., UE 14a, one base station 12a operates as the serving base station for the UE and other base stations 12b and 12c operate as cooperating base stations for that UE. Thus, a given base station such as the base station 12a performs serving base station functions 13a and cooperating base station functions 13b.

In systems where the CoMP payload is not a streaming type, but is rather a payload that is computed at the cooperating base station, the cooperating base station must compute and transmit the CoMP payload in time for the serving base station to use the CoMP payload to decode the UE transmission. The hybrid automated request, HARQ, timing within an exemplary LTE system is 4 milliseconds so that the CoMP payload should be delivered within, for example, 500 microseconds of receiving the transmission from the UE.

FIG. 2 is a timing diagram for implementing CoMP assistance according to known methods. In row 1, time slot 0, a grant requesting a transmission from a UE is transmitted by the serving base station. Row 4, time slot 0, shows a CoMP assistance request being transmitted by the serving base station. The label {D,S} indicates that the transmission of the CoMP assistance request is delay tolerant and of short payload size. Row 5, time slot 0, shows the CoMP assistance request being received by the cooperating base station. In row 2, time slot 4, the UE transmission is received by the serving base station and the cooperating base station. In row 6, time slot 5, the UE transmission is processed by the cooperating base station.

In row 7, time slot 6, a CoMP payload is determined by the cooperating base station based on the processed UE transmission. This CoMP payload is transmitted to the serving base station in time slot 6. The label {U,L} indicates that the CoMP payload is delay intolerant and of large payload size. Meanwhile, in row 3, time slots 5-7, the serving base station decodes the received UE transmission with the help of the CoMP payload. In row 1, time slot 8, a grant requesting transmission of a next block by the UE is sent to the UE from the serving base station. This next block is received by the serving base station and the cooperating base station in time slot 12. Decoding of this second UE transmission by the serving base station occurs after time slot 12, in row 3.

Since the timing of the base stations are synchronized, the short latency required for CoMP payload delivery—the CoMP payload being transmitted by time slot 6—results in undesired high peak data rates between the cooperating base stations and the serving base stations. After provisions are made to allow multiple cells to share with neighboring cells, the amount of required inter cellular bandwidth may easily exceed the non-CoMP case by a factor of 20 to 40 times. Further, this places a heavy load on processing power at the cooperating base stations to compute the CoMP payloads.

SUMMARY

The present invention advantageously provides a method and system for providing CoMP assistance in a wireless communication network. According to one aspect, the invention provides receiving a CoMP assistance request at a cooperating base station from a serving base station. The CoMP assistance request is a request for assistance to decode a first transmission from a UE. The cooperating base station receives the first transmission from the UE. The first transmission from the UE is received at the cooperating base station at one of a time before receiving the CoMP assistance request and a time after receiving the CoMP assistance request. The cooperating base station determines a CoMP payload in response to the CoMP assistance request. The CoMP payload is based on the received first transmission from the UE. The CoMP payload is forwarded to the serving base station after the serving base station determines that the first transmission from the UE is received by the serving base station with error.

According to an embodiment of this aspect, the invention provides receiving at the cooperating base station the first UE transmission at a time before receiving the CoMP assistance request. In one embodiment, the CoMP assistance request is received after the serving base station determines that the first UE transmission was received with error at the serving base station. In another embodiment, the CoMP payload is forwarded to the serving base station after the serving base station transmits a grant to the UE to re-transmit the first UE transmission but before the UE re-transmits the first UE transmission. In some embodiments, the first UE transmission is one of a first, second, third, or fourth hybrid automatic repeat request, HARQ, transmission. According to another embodiment, the CoMP payload is forwarded to the serving base station after a grant to the UE to transmit a second UE transmission is transmitted via the serving base station. In this embodiment the CoMP payload may be forwarded to the serving base station before reception of the second UE transmission. In another embodiment, the cooperating base station receives grant information before the first UE transmission is received by the serving base station. In this embodiment, the grant information may include an identity of the serving base station and an identity of the UE to which the grant is sent.

According to another aspect, the invention provides a method for providing CoMP assistance in a communication system that includes a serving base station and at least one cooperating base station. At the serving base station, a first grant is transmitted to a UE to trigger a first transmission by the UE. The serving base station receives the first UE transmission and determines that the first UE transmission is received with error. A second grant is transmitted to the UE to trigger a second UE transmission. A CoMP payload is received at the serving base station from at least one of the at least one cooperating base station after the transmitting of the second grant. The CoMP payload is calculated based on a decoding of the first UE transmission.

According to an embodiment of this aspect, the cooperating base station receives a CoMP assistance request from the serving base station, calculating the CoMP payload and transmitting the CoMP payload to the serving base station after the serving base station transmits the second grant. In one embodiment, a CoMP assistance request is transmitted by the serving base station before receiving the first transmission from the UE at the serving base station. In another embodiment, a CoMP assistance request is transmitted after the serving base station determines that the first transmission from the UE was received in error. In another embodiment, the second grant requests a re-transmission of the first transmission by the UE. In yet another embodiment, the second grant requests one of a re-transmission of the first transmission and a second transmission different from the first transmission based on an estimated probability that the CoMP payload to be received by the serving base station will enable correct decoding of the first transmission.

According to yet another aspect, the invention provides a serving base station for processing data from a UE based on CoMP information received from a cooperating base station. The serving base station includes a memory and a processor operating under the direction of computer code. The memory is configured to store a first transmission from the UE and to store a CoMP payload received from the cooperating base station. The processor is configured to send a first grant to request the first UE transmission and to receive the first UE transmission. The processor is further configured to send a second grant to request a second transmission from the UE. The processor receives a CoMP payload request from the cooperating base station after sending the second grant. The processor processes the CoMP payload to assist in decoding the first UE transmission.

According to an embodiment of this aspect, the processor is further configured to transmit a CoMP assistance request. In this embodiment, the CoMP assistance request may be sent prior to receiving the first transmission from the UE. In one embodiment, the second grant is to request a second transmission that is the same as the first transmission.

According to another aspect, the invention provides a cooperating base station to provide CoMP assistance to a serving base station to decode a first transmission received by the serving base station from a UE. The cooperating base station includes memory and circuitry. The memory is configured to store data of the first UE transmission and to store a CoMP payload. The circuitry is configured to receive a CoMP assistance request from the serving base station and to calculate the CoMP payload. The circuitry is further configured to transmit the CoMP payload to the serving base station after the serving base station determines that the first UE transmission was received with error.

According to an embodiment of this aspect, the CoMP assistance request is received after a time slot in which the first transmission is received by the serving base station. According to another embodiment, the CoMP assistance request is received after the serving base station determines that the first transmission is received with error. According to yet another embodiment, the CoMP assistance request is received before the first transmission is received by the serving base station. Also, in some embodiments, the CoMP payload is transmitted before the serving base station receives the second transmission from the UE.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
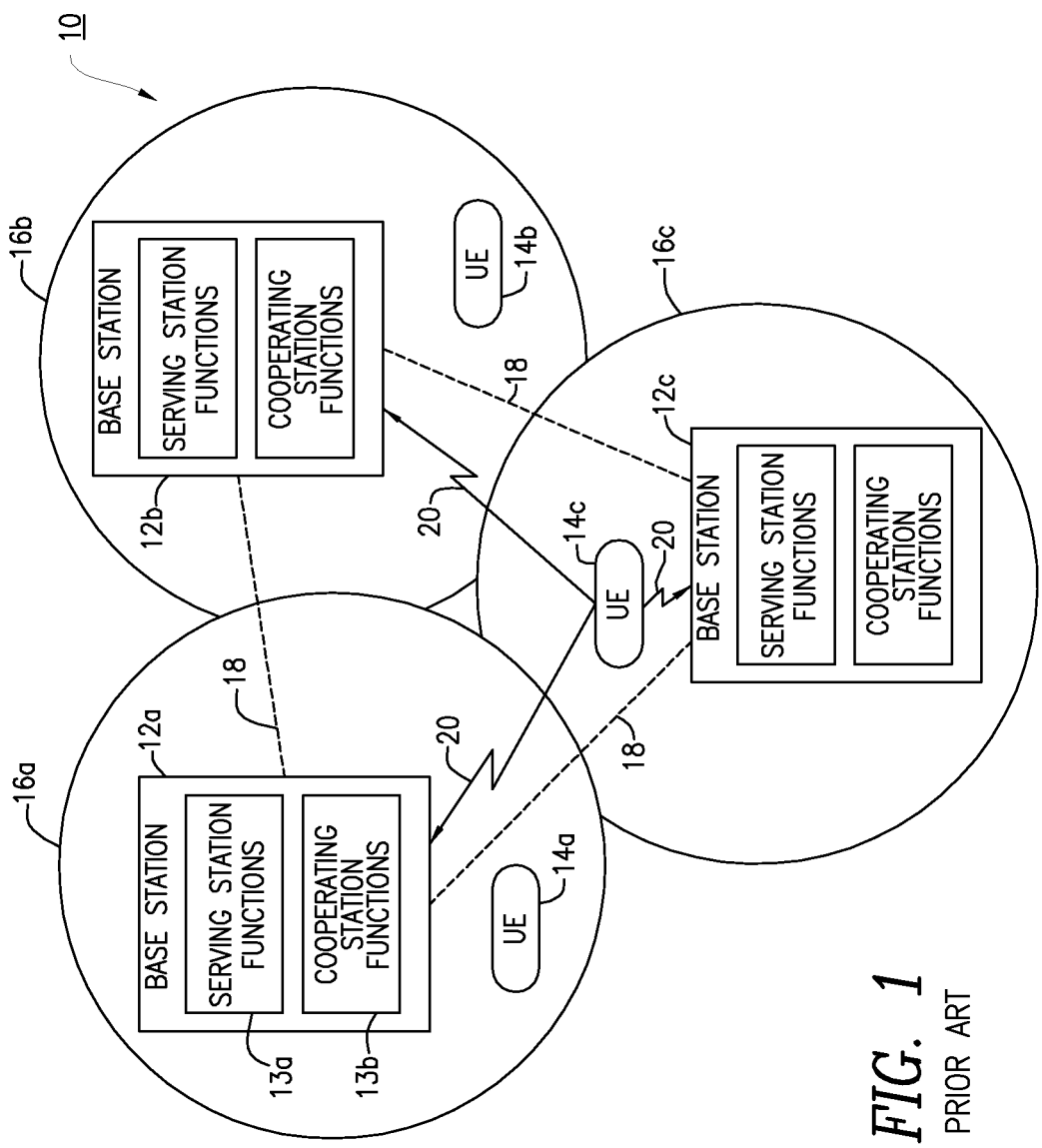
FIG. 1 is a block diagram of a known configuration of base stations and user equipment.
Figure 2:
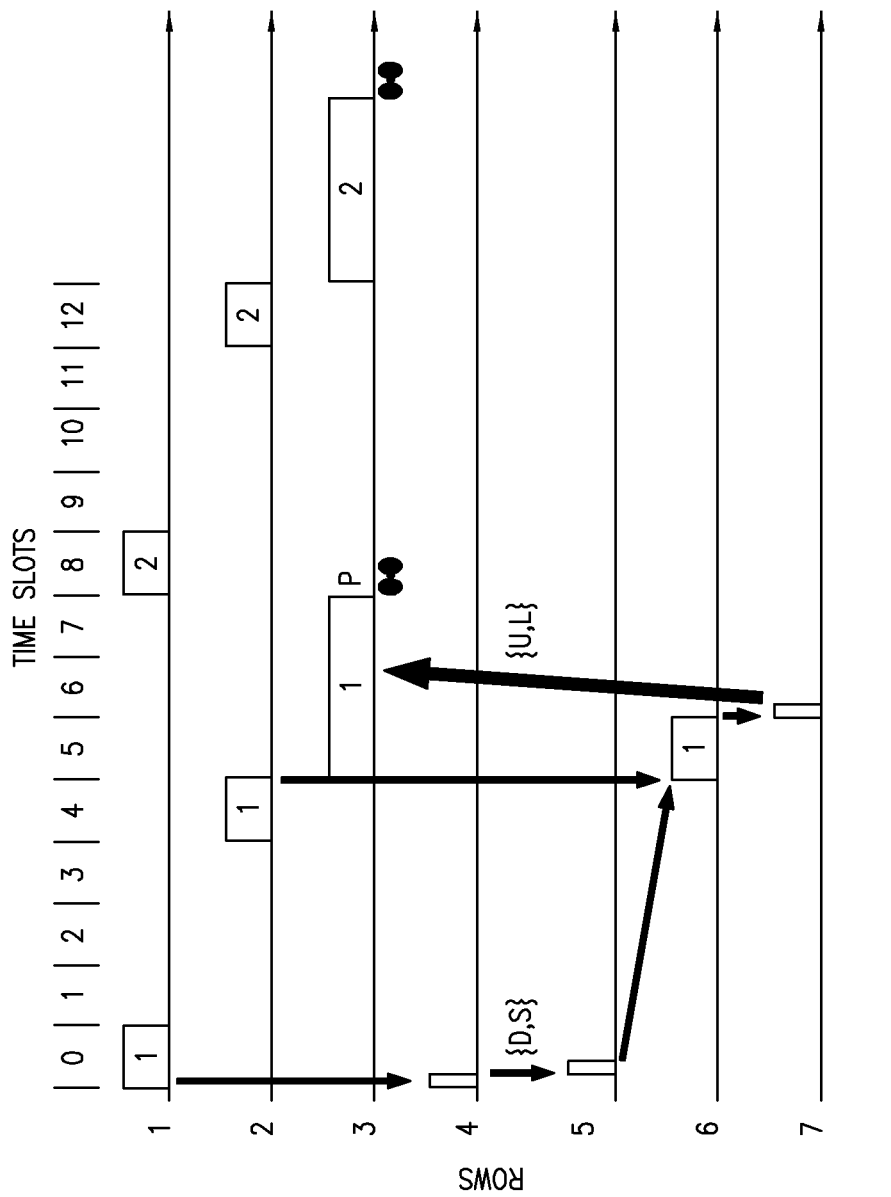
FIG. 2 is a timing diagram for implementing CoMP assistance in accordance with known methods.

Before describing in detail exemplary embodiments that are in accordance with the present invention, it is noted that the embodiments reside primarily in combinations of apparatus components and processing steps related to coordinated multi-point, CoMP, assistance in a wireless communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, CoMP assistance from a cooperating base station is provided to a serving base station, where the CoMP payload from the cooperating base station is delivered late in a process of providing CoMP assistance. In particular, the CoMP payload is delivered after the serving base station determines that a user equipment, UE, transmission has been received by the serving base station with error.

Figure 3:
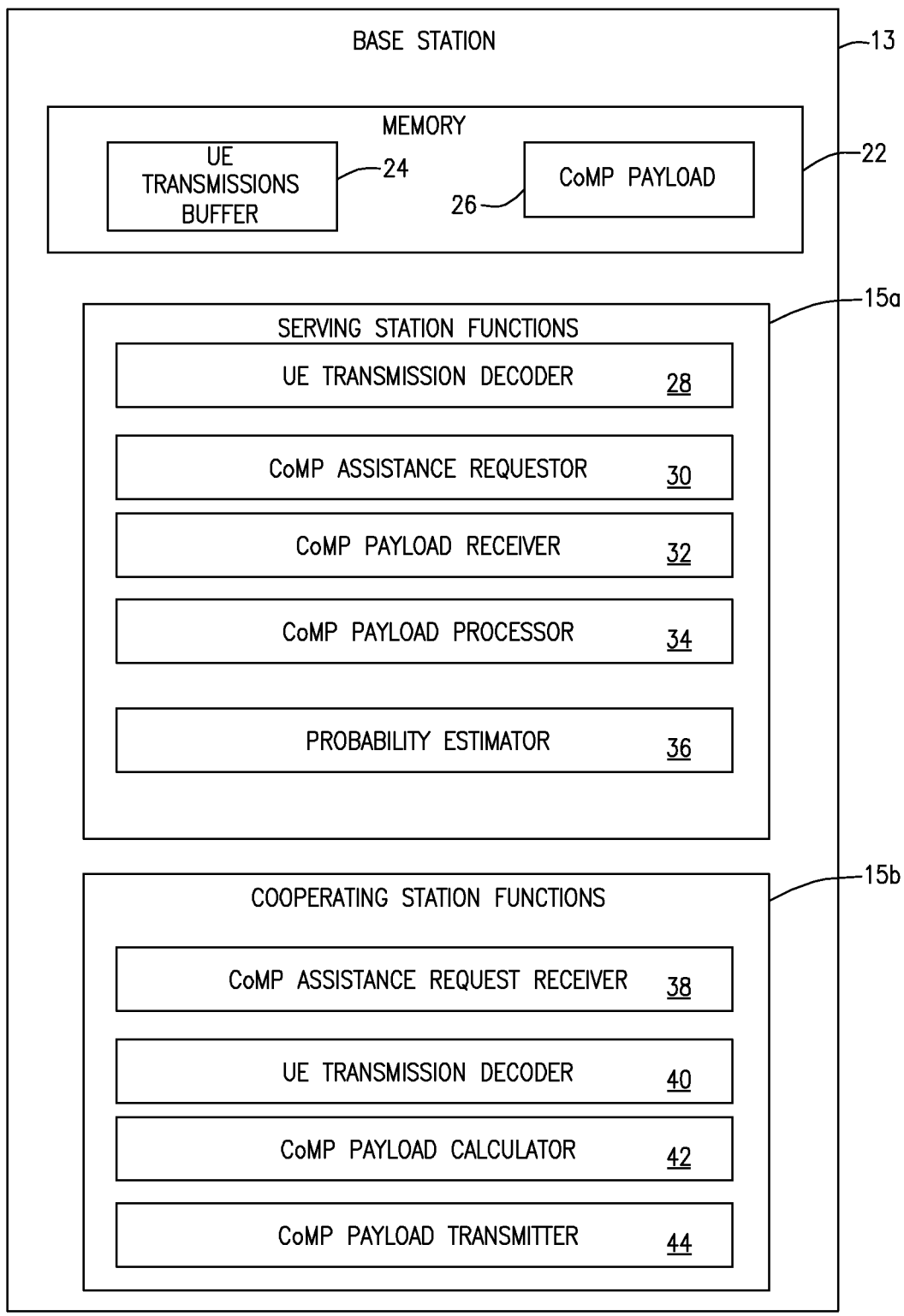
FIG. 3 is a block diagram of a base station constructed in accordance with principles of the present invention.

Referring again to the drawing figures, there is shown in FIG. 3 a block diagram of an exemplary base station 13 constructed in accordance with principles of the present invention. The base station 13 includes a memory 22, serving station functions 15a and cooperating functions 15b. The memory 22 includes storage for UE transmissions in a buffer 24 and CoMP payloads 26. The serving station functions 15a and cooperating station functions 15b may be implemented at least in part by a processor operating under the directions of software and/or dedicated circuitry. The base station 13 may serve as a serving base station and as a cooperating base station with respect to a UE 14, similar to base stations 12a, 12b, and 12c.

The serving station functions 15a include a UE transmission decoder 28 that decodes a UE transmission and performs a cyclic redundancy check, CRC, to determine if the UE transmission has been received with error. The serving station functions 15a include a CoMP assistance requestor 30 that formulates and transmits a request for CoMP assistance from one or more cooperating base stations. The CoMP request formulated by the CoMP assistance requestor 30 may include grant information for the desired UE, a priority of the request, quality thresholds for feedback from the cooperating base station to which the CoMP request is directed, and/or a type of CoMP assistance requested. The serving station functions 15a include a CoMP payload receiver 32, which may be implemented in hardware or a combination of hardware and software, to receive one or more CoMP payloads from one or more cooperating base stations. The serving station functions 15a include a CoMP payload processor 34 to process the CoMP payload by using the CoMP payload to assist in decoding the UE transmission. The serving station functions 15a may include a probability estimator 36 to estimate a probability that a future CoMP payload will enable the serving base station to successfully decode a UE transmission. This probability can be estimated from the HARQ index number. For example, the serving base station may operate at a provisioned set point such that the probability of a block error rate, BLER, is 10% for the first transmission, 1% for the second transmission and 0.1% for a third transmission, etc.

The cooperating station functions 15b include a CoMP assistance request receiver 38 that receives a CoMP request from the serving base station. The cooperating station functions 15b also include a UE transmission decoder 40 to decode a UE transmission. The cooperating station functions 15b also include a CoMP payload calculator 42 to calculate a CoMP payload based on the results of decoding the UE transmission. The cooperating station functions 15b also include a CoMP payload transmitter 44 to transmit the CoMP payload to the serving base station. As such, the CoMP payload transmitter 44 may be implemented in hardware or a combination of hardware and software.

Figure 4:
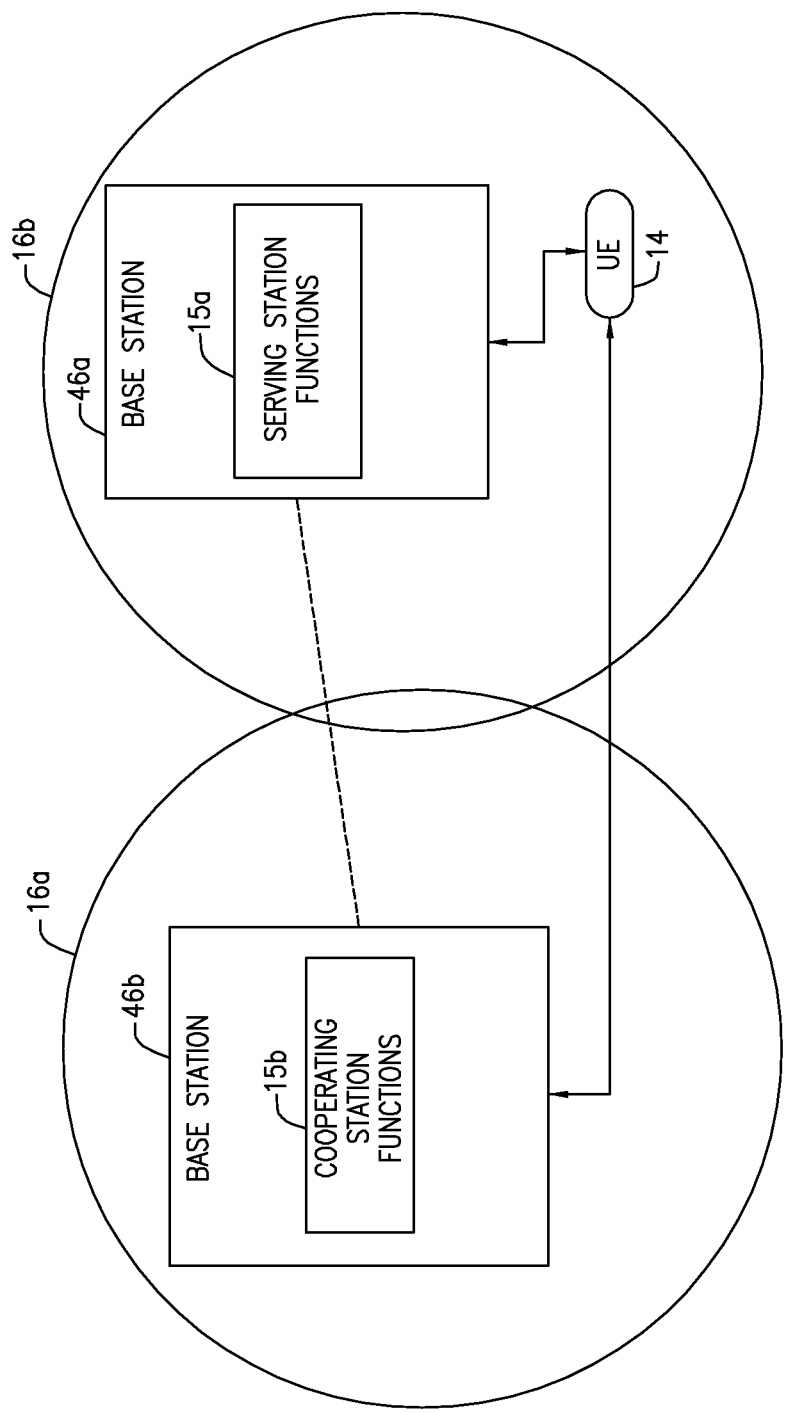
FIG. 4 is a block diagram of a wireless communications network in communication with a user equipment, UE.

FIG. 4 is a block diagram of an exemplary serving base station 46a and an exemplary cooperating base station 46b in communication with a UE 14. Base stations 46a and 46b may be configured as shown in FIG. 3 for base station 13. The serving base station 46a has serving station functions 15a and the cooperating base station 46b has cooperating station functions 15b. The serving and cooperating base stations 46a and 46b operate in accordance with one or another of the timing diagrams in FIGS. 5-7.

Figure 5:
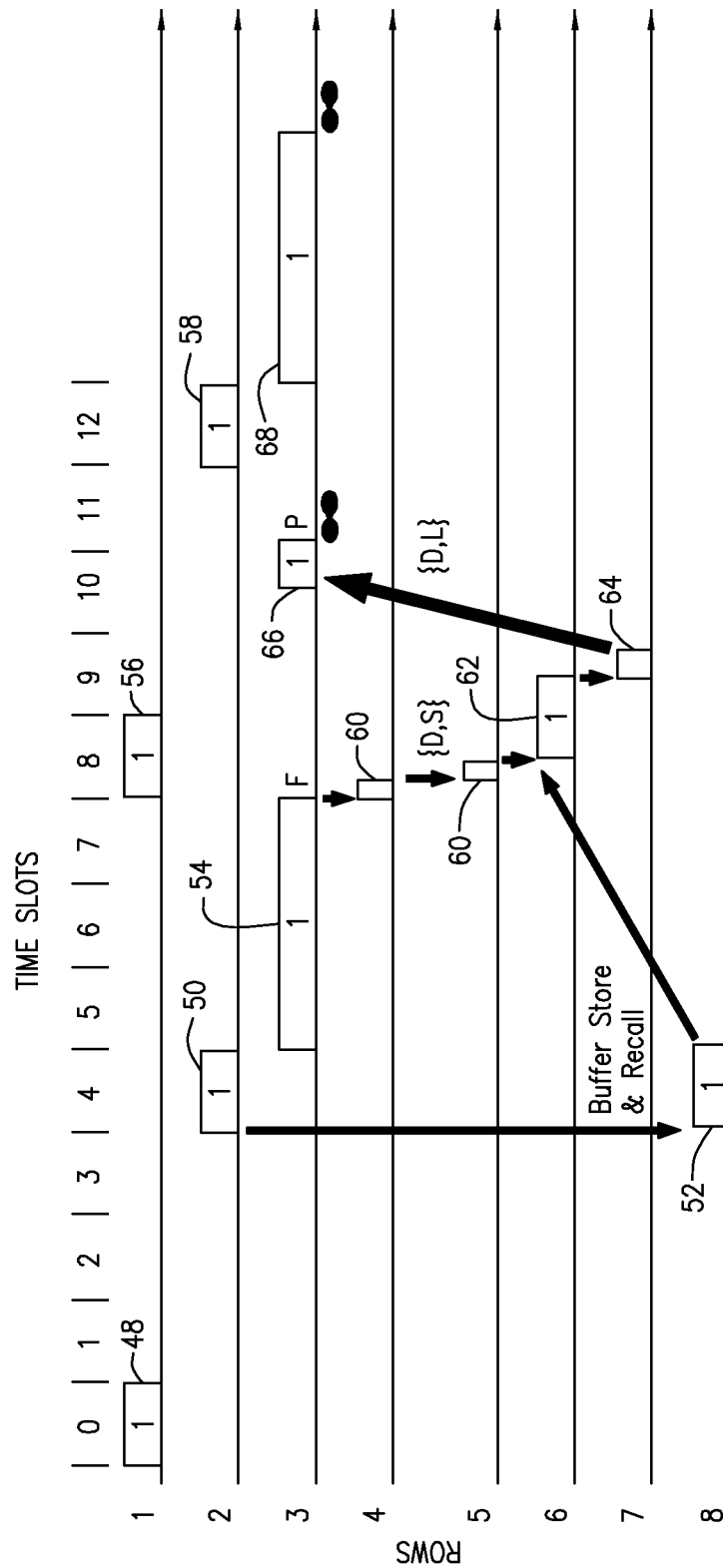
FIG. 5 is a timing diagram showing an exemplary implementation of CoMP assistance in accordance with a first embodiment of the invention.

FIG. 5 is a timing diagram showing an exemplary implementation of CoMP assistance from a cooperating base station 46b to a serving base station 46a in a case where the delivery of the CoMP payload is delayed. In FIG. 5, the time slots are the transmission time slots for transmitting over the air interface. The rows facilitate illustration of the timing events of the serving and cooperating base stations.

In row 1, time slot 0, a grant (48) is transmitted from the serving base station 46a to trigger the UE to transmit a data package. In row 2, time slot 4, the transmission (50) by the UE in response to the grant occurs. The transmission by the UE is stored by the cooperating base station 46b as shown in row 8, time slot 4, (52). This recording function is performed automatically and is not triggered. In row 3, time slots 5-7, (54), the serving base station 46a attempts to decode the transmission by the UE. In row 3, time slot 7, the serving base station 46a determines whether the first attempt to decode the transmission from the UE is successful. For example, if the decoded transmission fails a cyclic redundancy check, CRC, the UE transmission is deemed to have been received with error.

In row 1, time slot 8, (56), a second grant is sent to the UE, thereby triggering a second transmission by the UE that is received by the serving base station 46*a* in row 2, time slot 12, (58). If the decoding of the UE transmission in time slots 5-7 is not successful, then the second grant requests retransmission of the UE transmission previously received. If the decoding of the UE transmission in time slots 5-7 is successful, then the second grant requests transmission of a next UE transmission. In time slot 8, a CoMP assistance request is sent from the serving base station to the cooperating base station 46*b*, as shown in row 4, time slot 8 and row 5, time slot 8, (60). The label {D,S} in FIG. 5 denotes that the CoMP assistance request is a delay tolerant, small packet. Upon receipt of the CoMP assistance request, the cooperating base station 46*b* decodes the UE transmission, as shown in row 6, time slots 8 and 9, (62).

In row 7, time slot 9, the cooperating base station 46*b* determines a CoMP payload and. in row 7, time slot 9, (64), the CoMP payload from the cooperating base station 46*b* is transmitted to the serving base station 46*a*. The label {D,L} in FIG. 5 denotes that the CoMP payload is a delay tolerant, large packet. Having received the CoMP payload, the serving base station 46*a* makes a second attempt to decode the UE transmission, as shown in row 3, time slot 10, (66). If successful, the decoded block is sent to a next stage of processing. In row 2, time slot 12, (58), the second UE transmission is received by the serving base station 46*a* in response to the second grant sent by the serving base station in slot 8, (56). In row 3, after time slot 12, (68), the serving base station attempts to decode the most recently received transmission from the UE. If the decoding in slot 10 is successful, the decoded block is sent to a next stage of processing, and the retransmission of the UE transmission received in time slot 12 is ignored. If the attempt to decode in time slots 5-7 is unsuccessful, and the attempt to decode in time slot 10 is unsuccessful, then, after time slot 12, the serving base station 46*a* attempts to decode the retransmission of the original UE transmission.

Thus, the embodiment implemented according to the timing diagram of FIG. 5 provides a CoMP payload from the cooperating base station 46*b* late in the CoMP assistance process, as late as time slot 10 or even time slot 11. This is after the need for CoMP assistance is determined by the serving base station 46*a*. This means that assistance is only sought for failing UE transmission blocks. This ensures that the cooperating base station 46*b* does not expend computing resources on determining a CoMP payload when a CoMP payload is not needed, and the transport network is not consumed passing a CoMP payload that the serving station 46*a* does not require.

The embodiment of FIG. 5 uses the buffer 24 in the cooperating base station 46*b* to store the UE transmission. The buffer is used because the serving base station 46*a* does not give the cooperating base station 46*b* notification that a CoMP payload is required prior to the transmission time of the UE transmission. Upon receiving the CoMP request, the cooperating base 46*b* station retrieves the UE transmission from the buffer. The delay between storing the UE transmission into the buffer and retrieving the UE transmission out of the buffer may be as much as about 5 milliseconds, ms. The size of the buffer may typically be 8 to 10 Megabits, but could be larger depending on the data rate and level of sampling being supported. Finally, the process of FIG. 5 repeats for the next grant request sent by the serving base station 46*a*.

Figure 6:
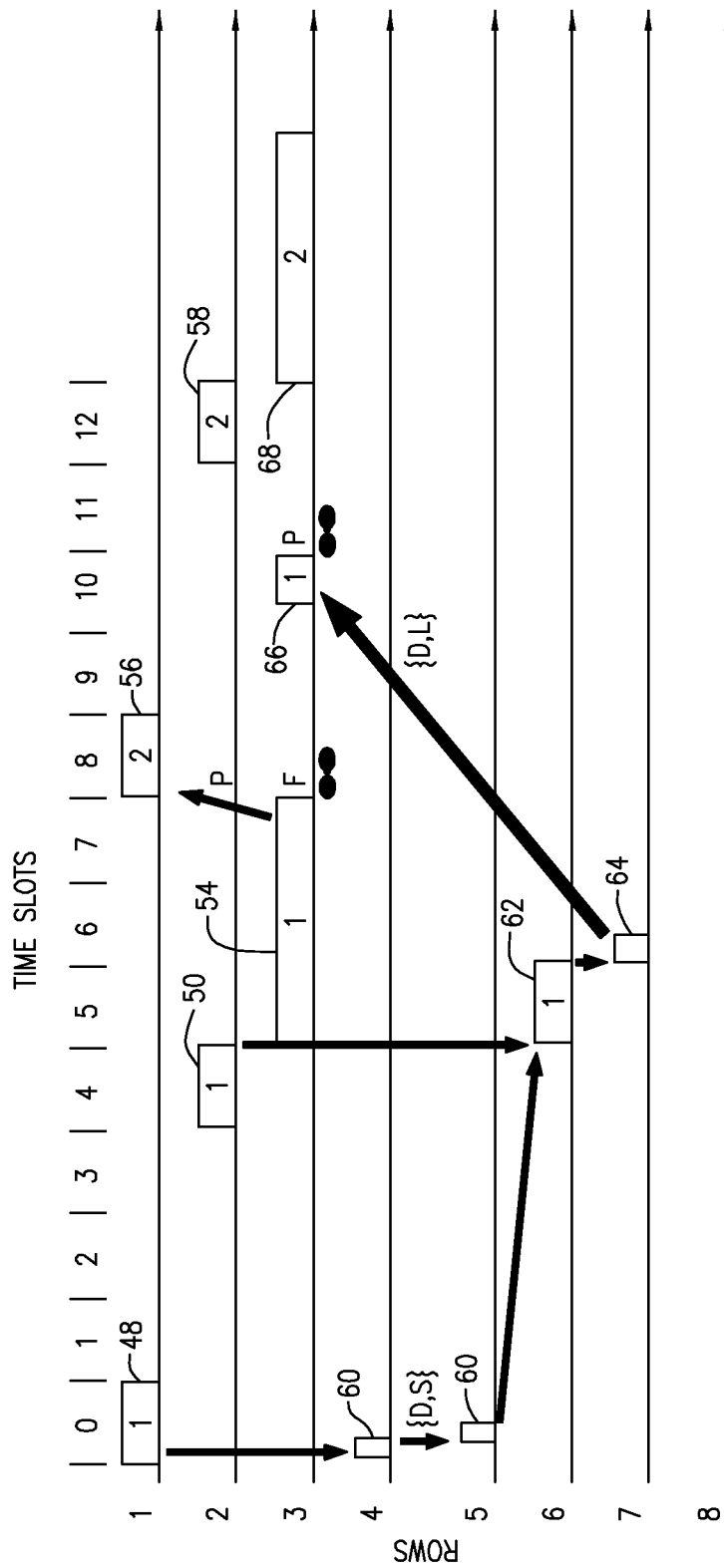
FIG. 6 is a timing diagram of an alternative implementation of CoMP assistance in accordance with a second embodiment of the invention.

The CoMP payload latency results in a much lower peak data rate between the serving base station 46*a* and the cooperating base stations. The lower peak data rate is achieved by delaying the transmission of at least some CoMP payloads from cooperating base stations until later in the CoMP assistance process so that not all CoMP payloads are transmitted at the same time. The selection of which CoMP payloads are to be delayed may be at random or based on a channel quality index associated with the cooperating base station and the UE, or may be based on a UE Quality of Service target FIG. 6 is a timing diagram of an alternative implementation of CoMP assistance from a cooperating base station 46*b* to a serving base station 46*a*. In row 1, time slot 0, 48, a grant requesting a transmission from a UE is transmitted from the serving base station 46*a* to the UE. Also in time slot 0, a CoMP assistance request is sent from the serving base station 46*a* to the cooperating base station 46*b*, as shown in rows 4 and 5, 60. Thus, a difference between the embodiment of FIG. 5 and the embodiment of FIG. 6 is that in the embodiment of FIG. 5 a CoMP assistance request is sent from the serving base station 46*a* to the cooperating base station 46*b* only if needed, whereas in the embodiment of FIG. 6, CoMP assistance requests are sent unconditionally. Consequently, in the embodiment of FIG. 5, the loading on the CoMP payload processor of the cooperating base station 46*b* is minimized as compared with the embodiment of FIG. 6, where the loading on the CoMP payload processor of the cooperating base station 46*b* is higher.

In FIG. 6, the serving base station 46*a* and the cooperating base station 46*b* receive a UE transmission in time slot 4, as shown in row 2, 50. In row 3, time slots 5-7, 54, the serving base station 46*a* attempts to decode the UE transmission and determine if the UE transmission is received with error. Also, in row 6, time slot 5, 62, the UE transmission is processed by the cooperating base station 46*b*. In row 7, time slot 6, 64, the cooperating base station 46*b* determines a CoMP payload based on the processed UE transmission. Note that determination of a CoMP payload may require more than one time slot in some embodiments.

In row 1, time slot 8, 56, a second grant is transmitted from the serving base station 46*a* to the UE. The second grant may request the UE to re-transmit its previous transmission, in the event that decoding during time slots 5-7 is unsuccessful, or may request the UE to transmit a new transmission, in the event that decoding during time slots 5-7 is successful. After time slot 7, the CoMP payload is sent from the cooperating base station 46*b* to the serving base station 46*a* in one of time slots 8-11, 66. In particular, FIG. 6 shows the CoMP payload being received in row 3, time slot 10, 66. In row 2, time slot 12, 58, the second UE transmission is received by the serving base station 46*a*, and the UE transmission is decoded in time slots using the received CoMP payload after time slot 12, 68. If the grant 56 requested a re-transmission, the CoMP payload provides additional information concerning the UE transmission that is useful in decoding the UE transmission at the serving base station. For example, the CoMP payload type may be one of transport block TB, log-likelihood ratio, LLR, and frequency domain IQ, FD-IQ, samples. Once again, because the CoMP payloads of some base stations are delivered later in the CoMP process, a much lower peak data rate between the serving base station 46*a* and the cooperating base stations is achieved.

In the embodiment of FIG. 6, the serving base station 46*a* makes a tentative decision whether the grant transmitted in time slot 8 will request a retransmission of the first UE transmission or will request a new transmission from the UE. The tentative decision may take into account a quality of information received in the first UE transmission. The serving base station 46*a*, in making the decision concerning the grant, may estimate the probability that the expected CoMP payload to be received from the cooperating base station 46*b* will enable correct decoding of the first UE transmission. The probability estimate may, for example, be based on a log likelihood ratio obtained from soft decoding of the UE transmission. For example, if the tentative decision based on the probability estimate is that the soon-to-be-received CoMP payload will not enable correct decoding, the serving station 46a may transmit a grant requesting a retransmission of the first UE transmission. If the decoding of the first UE transmission in time slots 5-7 is successful, the CoMP payload is not needed and is not used. Also, the UE transmission in time slot 12 is new and the process of FIG. 6 repeats.

In one embodiment, when the CoMP payload to be computed by the cooperating base station 46b is of the log-likelihood-ratio, LLR, type, the tentative decision can be sent from the serving base station 46a to the cooperating base station along with the quality of the serving base station's computed LLR derived from the first UE transmission. The cooperating base station 46b can observe the LLR computed by the serving base station 46b and compare it to a threshold. If the threshold is exceeded, then the use of the CoMP payload by the serving base station 46a will enable a successful decoding of the first UE transmission without need of using the second transmission from the UE.

If the tentative decision is that the soon-to-be-received CoMP payload will enable correct decoding, then the serving base station 46a may transmit a grant requesting the next block of data from the UE, rather than retransmission of the previously transmitted block of data. In this event, if the subsequent attempt in time slot 10, to decode the first UE transmission without error using the CoMP payload fails, a recovery mechanism may be employed. The recovery mechanism enables the serving base station 46a to instruct the UE to revert to transmitting the previous block. This involves modification of the HARQ and grant messages.

Figure 7:
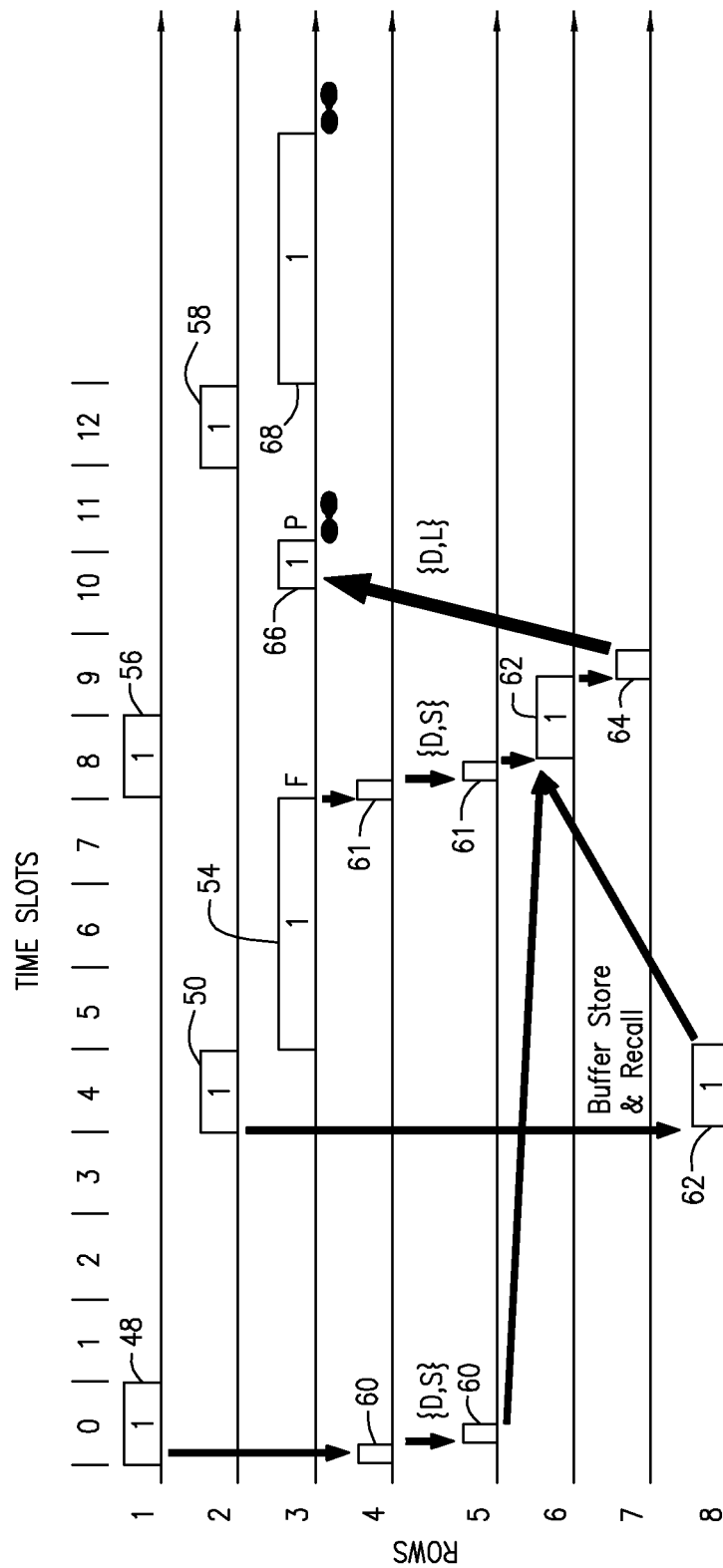
FIG. 7 is a timing diagram of a CoMP implementation that is a hybrid of the implementations of FIG. 5 and FIG. 6.

FIG. 7 is a timing diagram of a CoMP implementation that is a hybrid of the embodiments of FIG. 5 and FIG. 6. In FIG. 7, row 1, time slot zero, a grant, 48, is sent from the serving base station to the UE. In rows 4 and 5, time slot zero, 60, a preliminary request for CoMP assistance is transmitted to the cooperating base station 46b. The preliminary request for CoMP assistance may include an identity of the serving base station 46a and an identity of a UE to which the grant is sent, and may further include an identification of the placement of a UE's transmission in the frequency domain, the number of resource blocks being used, and the modulation and coding scheme, MCS.

In time slot 4, 50, the transmission from the UE is received at the serving base station 46a and the cooperating base station 46b. UE transmission decoding by the serving base station 46a is shown at row 3, time slots 5-7, 54. At the end of time slot 7, the serving base station 46a determines whether the UE transmission has been received with error. If so, a follow-up CoMP assistance request is sent to the cooperating base station 46b, rows 4 and 5, time slot 8, 61. The follow-up CoMP assistance request may include an identifier indicating that CoMP assistance is requested. By allocating the bulk of the CoMP assistance request information to the preliminary CoMP assistance request, the latter-transmitted follow-up CoMP assistance request can be minimal in size and can traverse the network more quickly.

Also, in row 1, time slot 8, 56, the serving base station 46a sends a second grant requesting re-transmission of the previous UE transmission if the first UE transmission from the UE if received in error, or requesting a new transmission if the first UE was not received with error. In row 6, time slot 8 and 9, 62, the UE transmission is retrieved from memory at the cooperating base station 46b and processed. The cooperating base station 46b computes a CoMP payload based on the retrieved UE transmission, as shown in row 7, time slot 9, 64. The CoMP payload is transmitted from the cooperating base station 46b and received by the serving base station 46a after time slot 7 and before time slot 13, 68. In particular, FIG. 7 shows the CoMP payload being received by the serving base station 46a at row 3, time slot 10, 66. In row 2, time slot 12, 58, the second UE transmission is received. If decoding of the first UE transmission during time slots 5-7 is successful, then the UE transmission received in time slot 12 is new and the process of FIG. 7 repeats. In such case, a new preliminary CoMP assistance request may be sent in time slot 8, (not shown in FIG. 7 for clarity). If, however, decoding of the first UE transmission during time slots 5-7 is unsuccessful, then the UE transmission received in time slot 12 is the next redundancy version of the first UE transmission, and an attempt to decode the UE transmission is repeated after time slot 12 using the CoMP payload received in time slot 10 and the next redundancy version of the UE transmission received in row 2, time slot 12 (58).

As noted, the reception of the CoMP payload can be sent by the cooperating base station 46b and received by the serving base station 46a in one of time slots 8-12. Thus, CoMP payload transmissions from a plurality of cooperating base stations can be spread out in time to reduce peak data rates occurring in a single time slot. Further, the timing of transmission and reception of a CoMP payload may be based on a quality of service, QoS, to be provided by the serving base station 46a for a particular UE. For example, the CoMP payloads may be transmitted in an earlier time slot for higher QoS and at a later time for lower QoS. Further, the timing of transmission and reception of CoMP payloads may be based on a priority assigned to a UE or a serving base station 46a.

In some embodiments, the base stations are biased to operate at a block error rate, BLER, of about 10%. When CoMP assistance is always requested, then 90% of the time the requested CoMP assistance is not needed. When CoMP assistance is only requested when needed, the CoMP loading may be reduced by a factor of 10. If the base stations are biased to operate at a BLER of about 50%, the CoMP loading may be reduced by a factor of 2. Consequently, methods described herein may reduce CoMP loading by 2 to 10 times.

Figure 8:
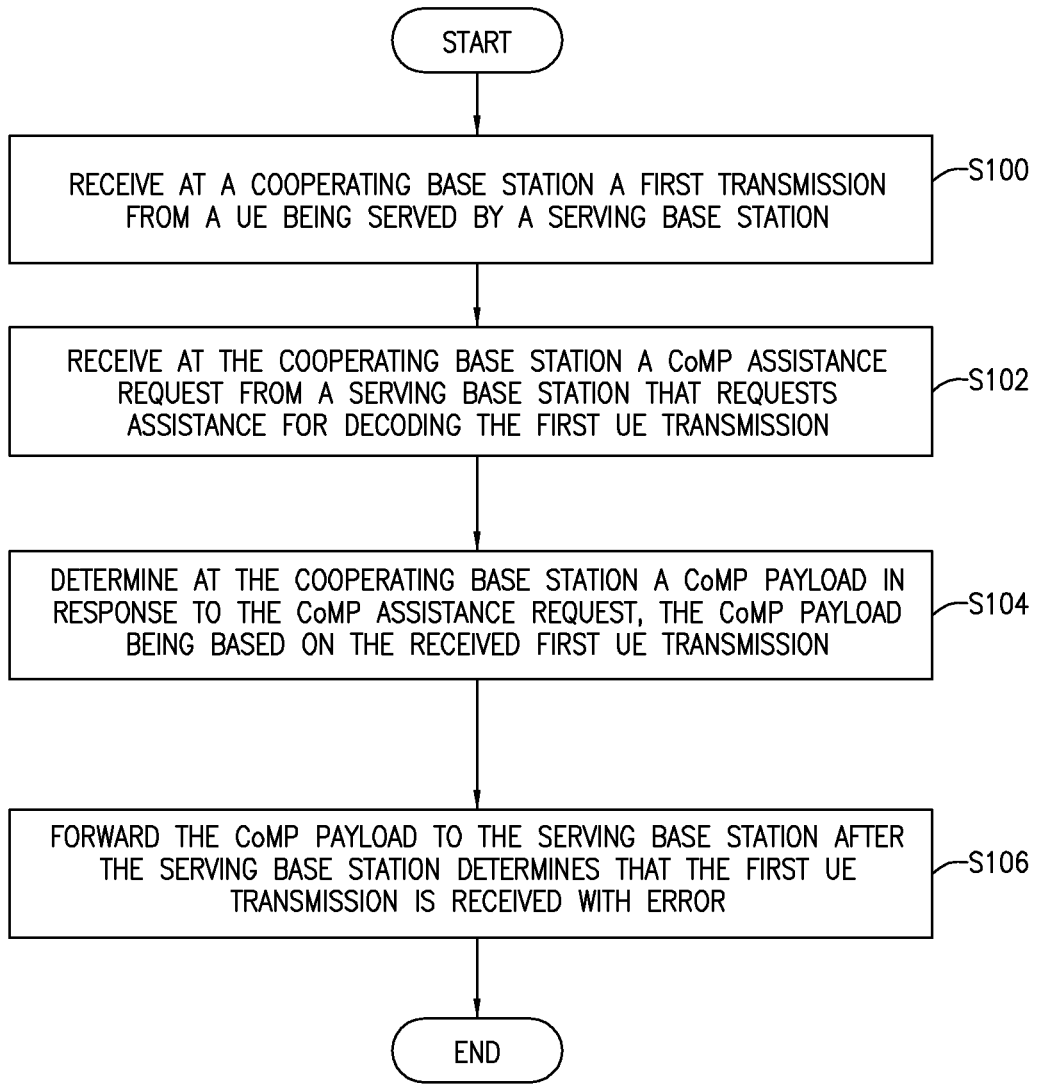
FIG. 8 is a flowchart of an exemplary process for providing CoMP assistance in accordance with principles of the present invention.

An exemplary process for providing CoMP assistance by a cooperating base station 46b is described with reference to FIG. 8. A first UE transmission being served by a serving base station 46a is received at a cooperating base station (block S100). A CoMP assistance request is received at the cooperating base station 46b from the serving base station 46a, the CoMP assistance request requesting assistance for decoding the first UE transmission (block S102). At the cooperating base station 46b, a CoMP payload is determined in response to the CoMP assistance request, the CoMP payload being based on the received UE transmission (block S104). The cooperating base station 46b forwards the CoMP payload to the serving base station 46a after the serving base station 46a determines that the first UE transmission is received with error (block S106).

Figure 9:
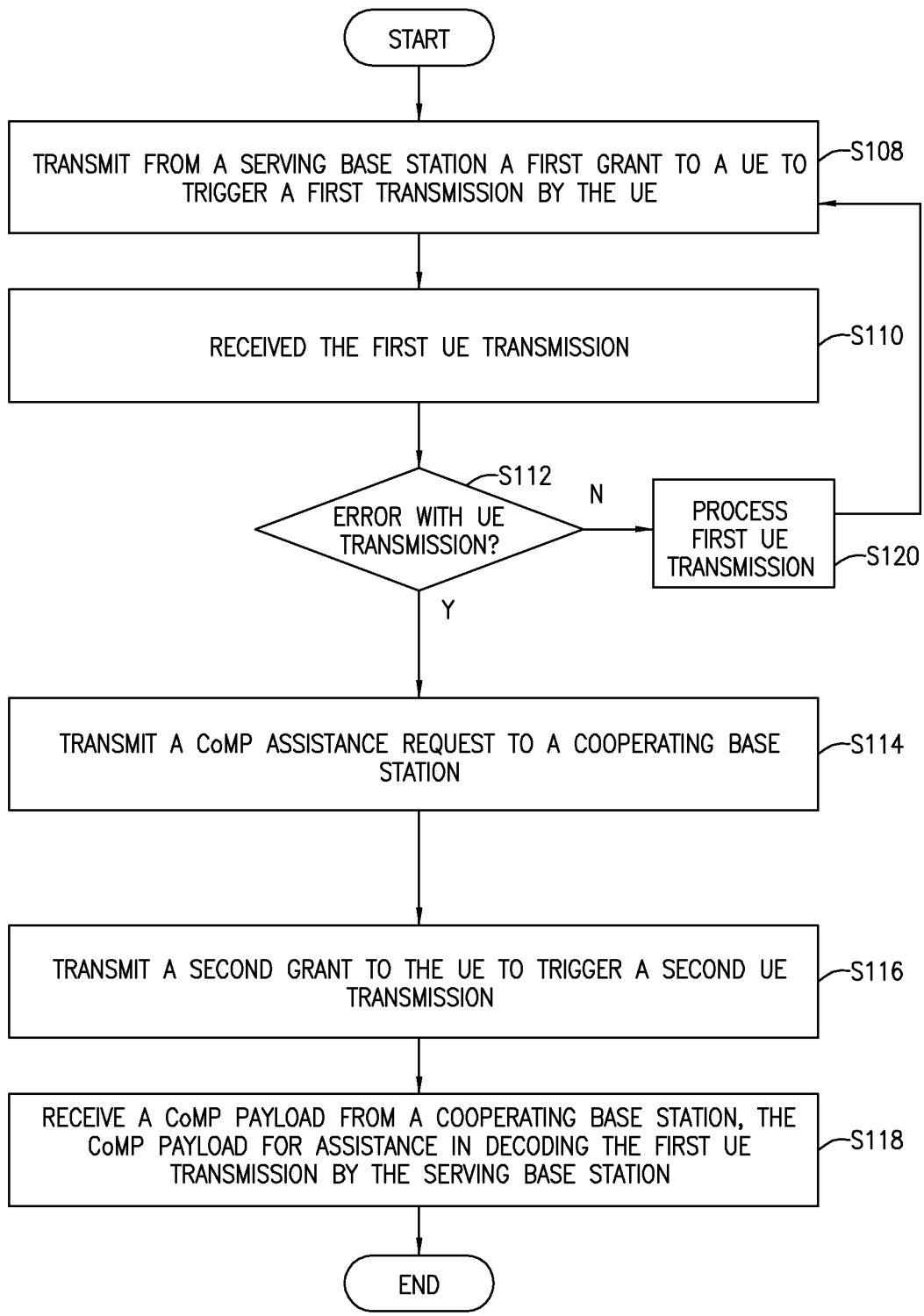
FIG. 9 is a flowchart of an exemplary process for obtaining CoMP assistance at a serving base station in accordance with principles of the present invention.

An exemplary process for obtaining CoMP assistance by a serving base station 46a is described with reference to FIG. 9. The serving base station 46a transmits a first grant to a UE to trigger a first transmission by the UE (block S108). The serving base station 46a subsequently receives the first transmission from the UE (block S110). The serving base station 46a determines whether the first UE transmission is received with error (block S112). If the first UE transmission is received with error, a CoMP assistance request is sent to the cooperating base station 46b (block S114). Then, a second grant is sent to the UE to trigger another transmission from the UE, wherein the request specifies that the UE is to re-transmit the previous UE transmission (block S116). A CoMP payload is received from a cooperating base station 46b for assistance in decoding the first UE transmission by the serving base station 46a (block S118). If the first UE transmission is not received with error (block S112), the serving base station 46a further processes the error-free UE transmission (block S120). Then, another grant is sent to the UE to transmit another UE transmission different from the previous transmission from the UE (block S108). In some embodiments, the CoMP assistance request is transmitted by the serving base station 46a before receiving the first transmission from the UE at the serving base station 46a. In one embodiment, a CoMP assistance request is transmitted after the serving base station determines that the first transmission from the UE was received in error. In another embodiment, the second grant requests a re-transmission of the first transmission by the UE.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for providing coordinated multi-point, CoMP, assistance in a wireless communication network, the method comprising:
    receiving at a cooperating base station a CoMP assistance request from a serving base station, the CoMP assistance request being a request for assistance to decode a first transmission from a user equipment, UE;
    receiving at the cooperating base station the first transmission from the UE, the first transmission from the UE being received at the cooperating base station at one of a time before receiving the CoMP assistance request and a time after receiving the CoMP assistance request;
    determining at the cooperating base station a CoMP payload in response to the CoMP assistance request, the CoMP payload being based on the received first transmission from the UE; and
    forwarding the CoMP payload to the serving base station after the serving base station determines that the first transmission from the UE is received by the serving base station with error, but within a time for providing CoMP assistance to the serving base station.

2. The method of claim 1, further comprising receiving at the cooperating base station the first UE transmission at a time before receiving the CoMP assistance request.

3. The method of claim 1, wherein the CoMP assistance request is received at the cooperating base station after the serving base station determines that the first UE transmission was received with error at the serving base station.

4. The method of claim 1, wherein the CoMP payload is forwarded to the serving base station after the serving base station transmits a grant to the UE to re-transmit the first UE transmission but before the UE re-transmits the first UE transmission.

5. The method of claim 1, wherein the first UE transmission is one of a first, second, third and fourth hybrid automatic repeat request, HARQ, transmission.

6. The method of claim 1, wherein the CoMP payload is forwarded to the serving base station after a grant to the UE to transmit a second UE transmission is transmitted via the serving base station.

7. The method of claim 6, wherein the CoMP payload is forwarded to the serving base station before reception of the second UE transmission.

8. The method of claim 1, further comprising receiving at the cooperating base station grant information transmitted before the first UE transmission is received by the serving base station.

9. The method of claim 8, wherein the grant information includes an identity of the serving base station and an identity of the UE to which the grant is sent.

10. A method for providing coordinated multi-point, CoMP, assistance in a communication system including a serving base station and at least one cooperating base station, the method comprising:
    at the serving base station;
        transmitting a first grant to a user equipment, UE, to trigger a first transmission by the UE;
        receiving the first transmission from the UE;
        determining that the first transmission by the UE is received with error;
        transmitting a second grant to the UE to trigger a second transmission by the UE; and
        receiving a CoMP payload from at least one of the at least one cooperating base station after the transmitting of the second grant and after determining that the first transmission by the UE is received with error, but within a time for processing the received CoMP payload for use in decoding the first transmission, the CoMP payload being calculated based on decoding the first transmission by the UE.

11. The method of claim 10, further comprising:
    at the at least one cooperating base station;
        receiving a CoMP assistance request from the serving base station;
        calculating the CoMP payload; and
        transmitting the CoMP payload to the serving base station after the serving base station transmits the second grant.

12. The method of claim 10, wherein a CoMP assistance request is transmitted by the serving base station before receiving the first transmission from the UE at the serving base station.

13. The method of claim 10, wherein a CoMP assistance request is transmitted after the serving base station determines that the first transmission from the UE was received in error.

14. The method of claim 10, wherein the second grant requests a re-transmission of the first transmission by the UE.

15. The method of claim 10, wherein the second grant requests one of a re-transmission of the first transmission and a second transmission different from the first transmission based on an estimated probability that the CoMP payload to be received by the serving base station will enable correct decoding of the first transmission.

16. A serving base station for processing data received from a user equipment, UE, based on coordinated multi-point, CoMP, information received from a cooperating base station, the serving base station comprising:
   a memory configured to store:
      a first transmission from the UE; and
      a CoMP payload received from the cooperating base station; and
   a processor configured to:
      send a first grant to request the first transmission from the UE;
      receive the first transmission from the UE;
      determine that the first transmission from the UE is received with error;
      send a second grant to request a second transmission from the UE;
      receive the CoMP payload from the cooperating base station after sending the second grant and after determining that the first transmission from the UE is received with error, but within a time for processing the received CoMP payload for use in decoding the first transmission; and
      process the CoMP payload to assist in decoding the first transmission from the UE.

17. The serving base station of claim 16, wherein the processor is further configured to transmit a CoMP assistance request.

18. The serving base station of claim 17, wherein the CoMP assistance request is sent prior to receiving the first transmission from the UE.

19. The serving base station of claim 16, wherein the second grant is to request a second transmission that is the same as the first transmission.

20. A cooperating base station to provide coordinated multi-point, CoMP, assistance to a serving base station to decode a first transmission received by the serving base station from a user equipment, UE, the cooperating base station comprising:
   a memory configured to store:
      data of the first transmission from the UE; and
      a CoMP payload; and
   a processor configured to:
      receive a CoMP assistance request from the serving base station;
      calculate the CoMP payload; and
      transmit the CoMP payload to the serving base station after the serving base station determines that the first UE transmission was received with error, but within a time for providing CoMP assistance to the serving base station.

21. The cooperating base station of claim 20, wherein the CoMP assistance request is received after a time slot in which the first transmission is received by the serving base station.

22. The cooperating base station of claim 20, wherein the CoMP assistance request is received after the serving base station determines that the first transmission is received with error.

23. The cooperating base station of claim 20, wherein the CoMP assistance request is received before the first transmission is received by the serving base station.

24. The cooperating base station of claim 20, wherein the CoMP payload is transmitted before the serving base station receives the second transmission from the UE.

* * * * *